United States Patent [19]

Baker

[11] Patent Number: 4,603,956

[45] Date of Patent: Aug. 5, 1986

[54] FILM-WIDTH AND TRANSMITTANCE SCANNER SYSTEM

[75] Inventor: Richard W. Baker, Anoka, Minn.

[73] Assignee: Pako Corporation, Minneapolis, Minn.

[21] Appl. No.: 671,954

[22] Filed: Nov. 16, 1984

[51] Int. Cl.[4] ..................... G03D 13/00; G01N 21/84; G01B 11/04

[52] U.S. Cl. .................................... 354/298; 356/443; 356/383; 356/386; 250/560; 250/571

[58] Field of Search ................ 354/298; 356/443, 444, 356/383, 386; 250/559, 560, 571

[56] References Cited

U.S. PATENT DOCUMENTS

| | | | |
|---|---|---|---|
| 3,472,143 | 10/1969 | Hixon et al. | 95/89 |
| 3,554,109 | 10/1969 | Street | 95/89 |
| 3,559,555 | 2/1971 | Street | 95/89 |
| 3,561,344 | 2/1971 | Frutiger | 95/89 |
| 3,696,728 | 10/1972 | Hope | 95/89 |
| 3,787,689 | 1/1974 | Fidelman | 250/219 FR |
| 3,927,417 | 12/1975 | Kinoshita et al. | 354/298 |
| 3,943,361 | 3/1976 | Miller | 250/560 X |
| 4,002,919 | 1/1977 | Linard | 250/560 |
| 4,057,818 | 11/1977 | Gaskell et al. | 354/298 |
| 4,101,216 | 7/1978 | Grossman | 356/444 |
| 4,104,670 | 8/1978 | Charnley et al. | 354/324 |
| 4,119,952 | 10/1978 | Takahashi et al. | 340/309 |
| 4,128,325 | 12/1978 | Melander et al. | 354/298 |
| 4,134,663 | 1/1979 | Laar et al. | 354/298 |
| 4,174,169 | 11/1979 | Melander et al. | 354/324 |
| 4,293,211 | 10/1981 | Kaufmann | 354/298 |
| 4,295,729 | 10/1981 | Kaufmann | 354/324 |
| 4,314,753 | 2/1982 | Kaufmann | 354/321 |
| 4,332,456 | 6/1982 | Kaufmann | 354/298 |
| 4,346,981 | 8/1982 | Kaufmann | 354/324 |
| 4,372,665 | 2/1983 | Kaufmann | 354/298 |
| 4,372,666 | 2/1983 | Kaufmann | 354/298 |
| 4,422,152 | 12/1983 | Kaufmann | 364/502 |
| 4,506,969 | 3/1985 | Baker | 354/298 |

FOREIGN PATENT DOCUMENTS

| | | | |
|---|---|---|---|
| 1012014 | 12/1965 | United Kingdom | 250/560 |

*Primary Examiner*—William B. Perkey
*Attorney, Agent, or Firm*—Kinney & Lange

[57] ABSTRACT

A replenishment control system for a graphic arts continuous-tone film processor includes a scanner which scans a light spot across the film transport path and a sensor bar for receiving the light spot. The output of the sensor bar is periodically sampled during each scan of the light spot to produce a plurality of sample values for scan. Each sample value is then converted to a density value, and the density values are summed to produce an integrated density. Replenishment control signals for developer and fix replenishment are produced as a function of the integrated density.

21 Claims, 16 Drawing Figures

Fig. 1
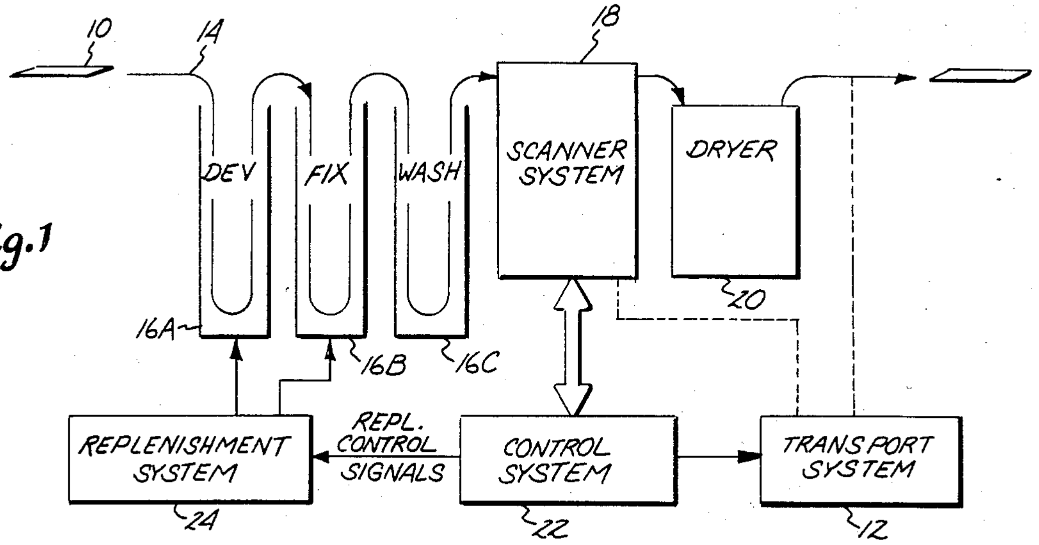
Fig. 2
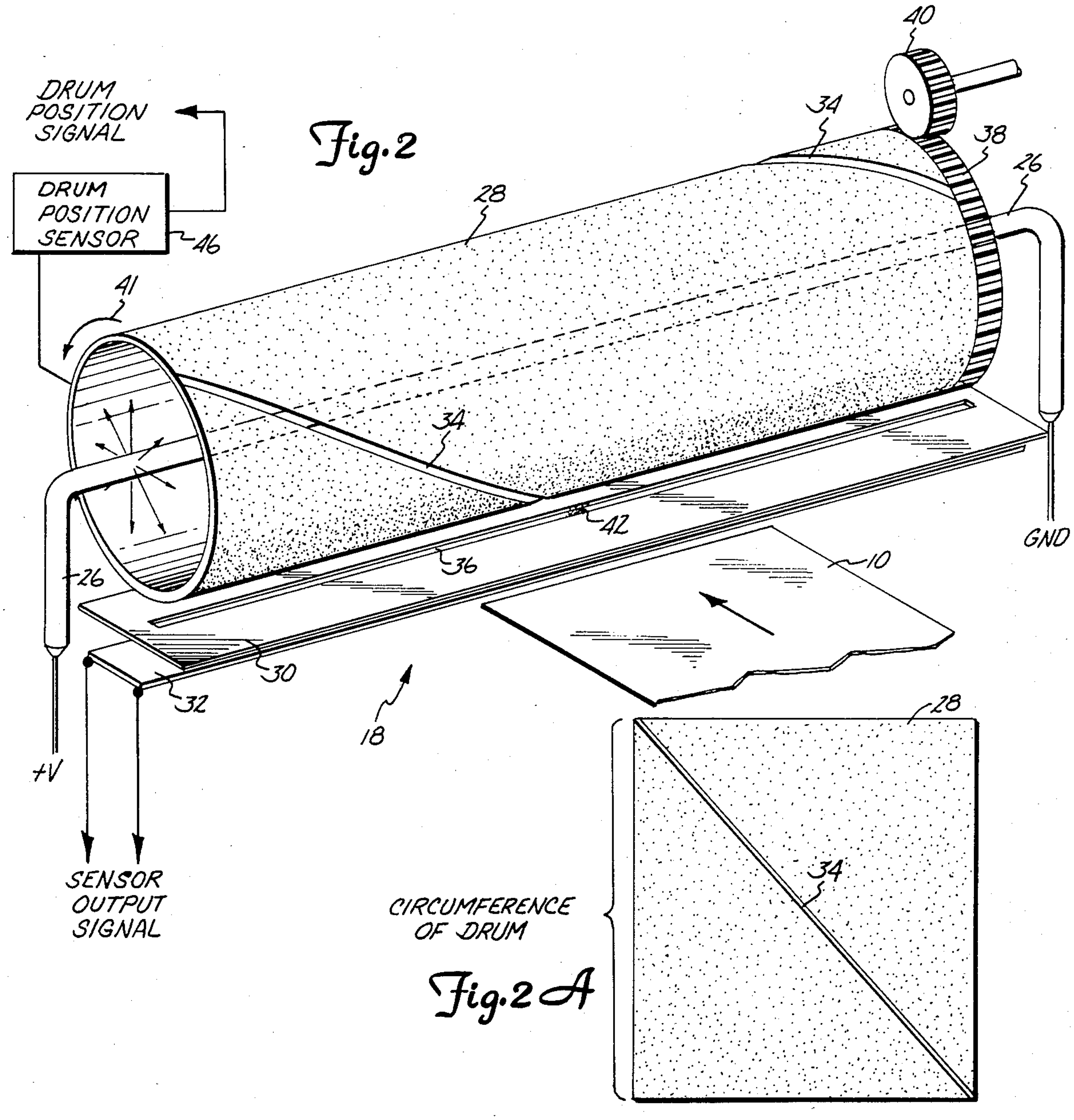
Fig. 2A

Fig. 3
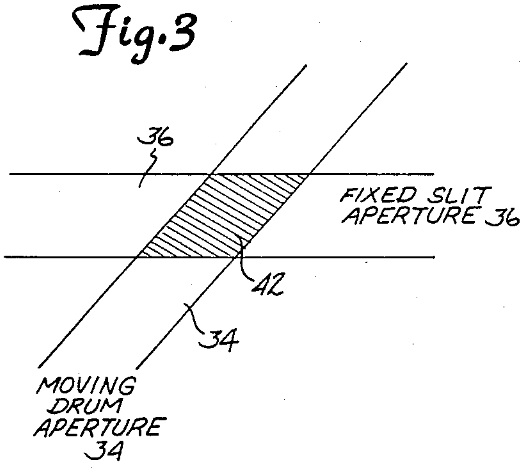
Fig. 4
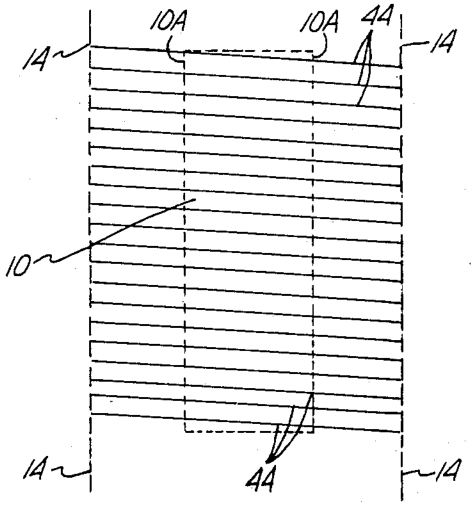
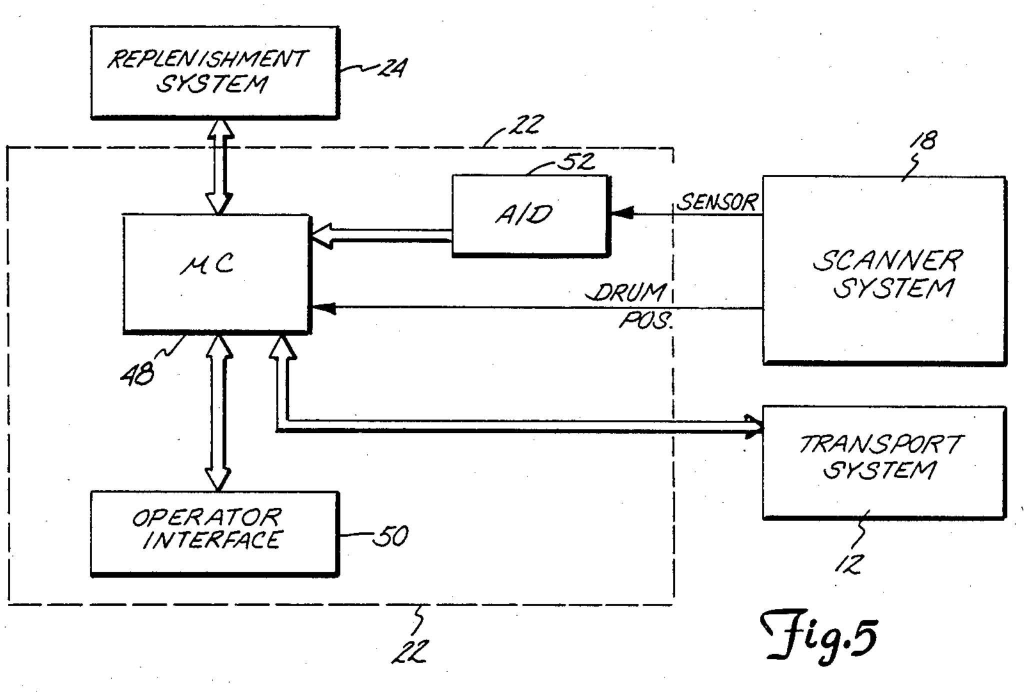
Fig. 5
Fig. 6A
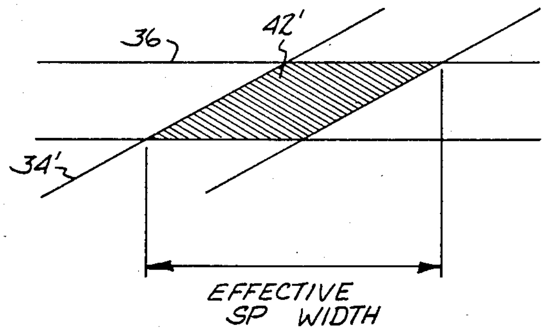
Fig. 6B
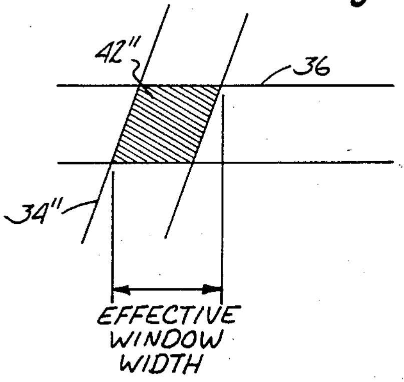

FILM-WIDTH AND TRANSMITTANCE SCANNER SYSTEM

BACKGROUND OF THE INVENTION

1. Field of the Invention

The present invention relates to automatic replenishment systems for processors of photosensitive material. In particular, the present invention relates to an improved film width and transmittance scanning system for controlling developer and fix replenishment in a graphic arts film processor.

2. Description of the Prior Art

Graphic arts film processors require replenishment of developer and fixer to compensate for change in the chemical activity resulting from the processing of photosensitive film. Replenishment systems were originally manually operated. The operator would visually inspect the film being processed and would manually operate the replenishment systems as he deemed necessary. The accuracy of these types of manual replenishment systems was obviously based upon the skill of the operator.

In recent years, automatic replenishment systems have found increasing use. These systems typically utilize film transmittance measurements to control the operation of the replenishment system. Examples of automatic replenishment systems are shown in U.S. Pat. No. 4,104,670 to Charnley et al, U.S. Pat. No. 4,057,818 to Gaskell et al, U.S. Pat. No. 4,128,325 to Melander et al, U.S. Pat. No. 4,174,169 to Melander et al, and U.S. Pat. Nos. 4,293,211, 4,295,729, 4,314,753, 4,332,456, 4,346,981, 4,372,665, 4,372,666 and 4,422,152 to Kaufmann. All of these patents are assigned to the same assignee as the present application. Other examples of automatic replenishment systems may be found in U.S. Pat. No. 3,472,143 to Hixon et al, U.S. Pat. No. 3,554,109 to Street et al, U.S. Pat. No. 3,559,555 to Street; U.S. Pat. No. 3,561,344 to Frutiger et al, U.S. Pat. No. 3,696,728 to Hope, U.S. Pat. No. 3,787,689 to Fidelman, U.S. Pat. No. 3,927,417 to Kinoshita et al, U.S. Pat. No. 4,119,952 to Takahashi et al and U.S. Pat. No. 4,134,663 to Laar et al.

In a typical graphic arts automatic replenishment system, a scanner is used to measure transmittance of the film after it has been developed. The scanner includes a light source positioned on one side of the film path, and a light receiver positioned on the opposite side of the film path. The amount of light which passes from the light source to the receiver is modulated by the film passing inbetween. This is a measurement of transmittance (T), which is the ratio of "transmitted" to "initial" illuminance.

There are two basic types of film that are processed by a graphic arts processor: half-tone film and continuous-tone flm. Half-tone film consists of varying sizes of discrete dots, while continuous-tone film is based on continuous variation of the transmissive qualities of the film. Because of the different properties of half-tone and continuous-tone film, the same average transmittance, as measured by a scanner, will require markedly different amounts of developer replenishment.

In half-tone film, if a spot is developed at all, it is completely developed, and if a spot is clear, it is completely clear. For example, for a film with "30% dot", thirty percent of the silver has been developed, and this covers thirty percent of the film. With thirty percent of the surface of the film opaque, thirty percent of the incident light will be blocked and seventy percent of the incident light will be detected by the sensing strip. In terms of the definition of transmittance T, if the light source prior to film arrival ("no film") is normalized to one hundred percent (100%), and seventy percent (70%) of the light is transmitted when film is present, then the ratio of the transmittance to the initial illuminance is seventy percent (i.e. T=70%).

Developer replenishment is based on the amount of silver that was developed and is blocking light. In a half-tone film, developer replenishment is proportional to the percentage dot, that is proportional to one hundred percent minus average percentage transmittance. In the example given above, in which transmittance is seventy percent, thirty percent of the maximum developer replenishment volume recommended for a totally exposed film must be used.

As a first approximation for continuous-tone film, optical density D is proportional to the amount of silver present in the image, and density is therefore the appropriate number to use to measure the photographic effect. This is an approximation because the D log E curve flattens out on both ends and is not a pure straight line for the full range of the long scale. Density is a logarithm (to the base 10) of the opacity (where opacity is the reciprocal of the transmittance). In other words:

$$D=\log_{10}(1/T)$$

For example, using a 40% transmittance, density equals 0.22. For any given type of continous-tone film, there is a maximum obtainable density value associated with it, where the D log E curve flattens out. This is considered a fully exposed film, and results in a density of approximately 2.00 to 4.00 for most films, although it can be higher or lower depending on film type.

If the film type specifies a maximum density and a corresponding replenishment rate for fully exposed film, a proportional replenishment volume can then be derived. For example, if the maximum density is D=2.00 and replenishment volume for fully exposed film equals 1 cc/square inch, a sensed transmittance of 40% (resulting in a computed density of 0.22) results in a replenishment rate of 0.11 cc/square inch.

By referencing a table that converts densitometer density readings of a half-tone film to the actual percentage dot of that film, it is possible to compare continuous tone and half tone films and their required replenishment rates. With the understanding that continuous tone replenishment is proportional to density and halftone replenishment is proportional percentage dot, the following example will compare different density levels between the two types of film.

If the same replenishment rate X is given for a 50% dot for half-tone and 0.301 density for continous tone, the following table relates the replenishment volume and other points of percentage dot versus the 50% level.

| CONTINUOUS TONE "DENSITY" | REPLENISHMENT VOLUME | % DOT | HALF TONE REPLENISHMENT VOLUME |
|---|---|---|---|
| 0.046 | (0.153)*(X) | 10 | (0.20)*(X) |
| 0.097 | (0.322)*(X) | 20 | (0.40)*(X) |
| 0.155 | (0.515)*(X) | 30 | (0.60)*(X) |
| 0.222 | (0.738)*(X) | 40 | (0.80)*(X) |
| 0.301 | (1.000)*(X) | 50 | (1.00)*(X) |
| 0.398 | (1.322)*(X) | 60 | (1.20)*(X) |

-continued

| CONTINUOUS TONE "DENSITY" | REPLENISHMENT VOLUME | % DOT | HALF TONE REPLENISHMENT VOLUME |
|---|---|---|---|
| 0.523 | (1.738)*(X) | 70 | (1.40)*(X) |
| 0.699 | (2.322)*(X) | 80 | (1.60)*(X) |
| 1.000 | (3.322)*(X) | 90 | (1.80)*(X) |

The worst case listed above is at the 90% dot level, where continous-tone film requires almost twice the replenishment as half-tone film even though the transmittance is the same.

It should be noted that by selecting the 50% dot level as the point of reference, the magnitude of the deviation between the two types of film has been minimized. If a point is picked at the low end of the table as the reference point, the deviation is even greater. Assume, for example, that a 5% dot half-tone film and a continous-tone file of density 0.022 both require X volume of replenishment. At 95% dot, the half-tone film will require $(95/5)^*(X)=19X$ replenishment. The continuous-tone time at the same densitometer reading would require $(1.301/0.022)^*(X)=59X$ replenishment. In other words, the continuous-tone film would require more than 3 times as much replenishment as half-tone film for the same effective change in the amount of light transmitted through the film.

In other words, continuous-tone film and half-tone film cannot be accurately replenished on the same basis with the same ratio. Half-tone replenishment is proportional to percentage dot, while continuous-tone replenishment is proportional to density.

Conventional scanners used in graphic arts film processors, while termed "density" scanners, are in fact transmittance sensing devices. The film passes between a light source and a light receiver. The scanner output is the integral of light transmitted minus light blocked over the width of the scanner. The scanner output signal is then integrated over the length of the film to produce an integrated signal which represents $100\%-\%T=\%$ dot.

By design, these types of scanners are incapable of accurately replenishing continuous-tone film. The output of the scanner is an integral or summation of the transmittance complement (100%−%T) over the width of the scanner. At this point, the scanner output signal has already been integrated on the basis of percent dot over the entire width of the scanner. Accurate continuous-tone film replenishment, however, should be based on the integral of the densities of various segments of the film, i.e. on a point by point basis.

SUMMARY OF THE INVENTION

The present invention is an automatic replenishment system which provides accurate replenishment for continuous-tone film. In the present invention, a light spot is scanned across the film transport path, and intensity of the light spot is sensed after the light spot is passed through the film transport path. A sensor signal representing the sensed intensity is periodically sampled during each scan to provide a plurality of sample values for each scan. Each sample value is converted to a density value, and the density values are then summed to produce an integrated density value. Replenishment is controlled as a function of the integrated density value.

In preferred embodiments of the present invention, the scanned light spot is produced by a scanner which includes an elongated light source and means positioned between the light source and the film transport path for moving an aperture in a transverse direction so as to scan the light spot across the transport path. The means for moving the aperture includes, in preferred embodiments, a cylindrical drum surrounding the elongated light source. The drum is generally opaque, and has a helical transparent slit. As the drum is rotated about its central axis, the helical slit causes an effective scanning movement of the light spot in the transverse direction.

BRIEF DESCRIPTION OF THE DRAWINGS

FIG. 1 is a block diagram of a graphic arts film processor.

FIG. 2 is a perspective view of a first preferred embodiment of the scanner system of the graphic arts film processor.

FIG. 2A shows the surface of the rotating drum of FIG. 2 when rolled out flat.

FIG. 3 is a diagram illustrating the interaction of the fixed slit aperture and the moving drum aperture of FIG. 2 in defining the moving light spot.

FIG. 4 is a diagram illustrating the effective scanning pattern of the scanner of FIG. 2.

FIG. 5 is an electrical block diagram of the automatic replenisher control system of the processor of FIG. 1.

FIGS. 6A and 6B illustrate the effect of different drum aperture attack angles on the effective window width of the moving aperture.

DETAILED DESCRIPTION OF THE PREFERRED EMBODIMENTS

Figure 7:
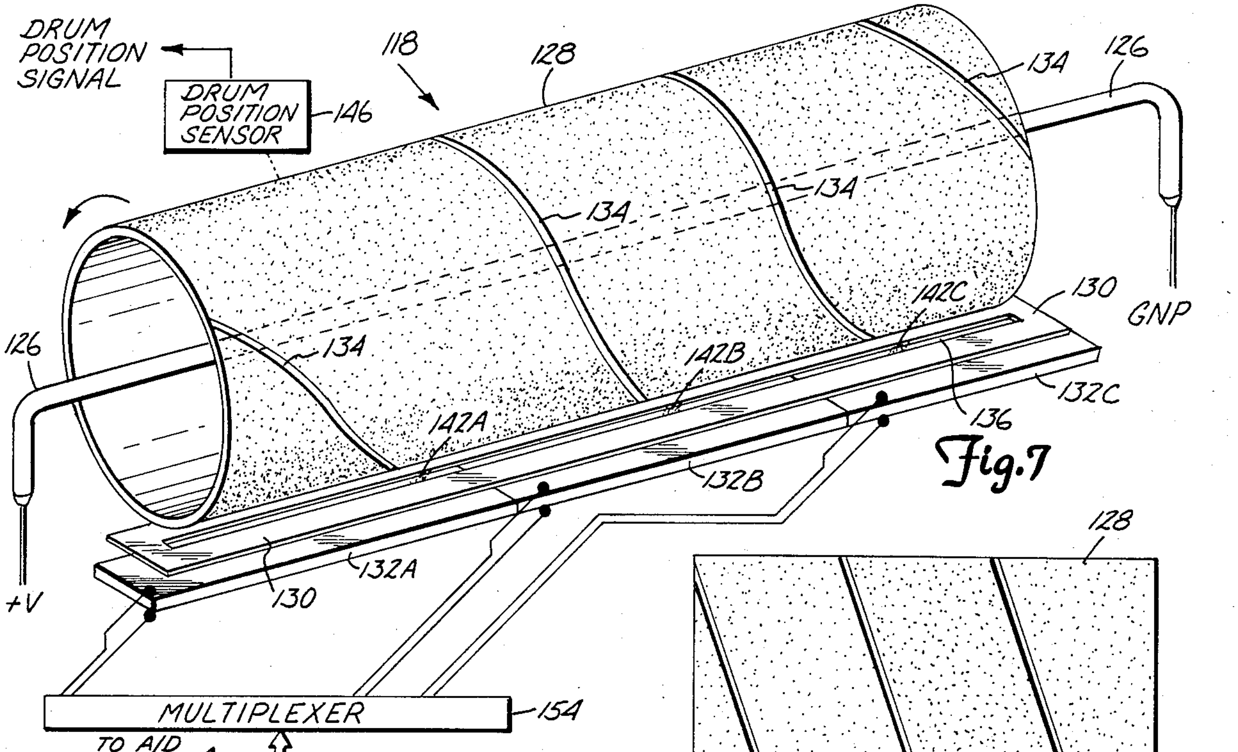
FIG. 7 shows a second embodiment of the scanner.

FIG. 1 shows a graphic arts film processor which processes sheets or webs of exposed photosensitive film 10. Film 10 is transported by transport system 12 along a transport path 14 through developer, fix and wash tanks 16A, 16B and 16C, through scanner system 18, and through dryer 20.

As film 10 passes through scanner system 18, a light spot is scanned transversely across the film transport path 14 and the intensity of the light spot transmitted through film 10 is sensed. Scanner system 18 provides signals to control system 22 which indicate the intensity and location of the light spot. Based upon the scanner output signals, control system 22 derives width, length and density values from which the appropriate amounts of developer and fix replenishment can be derived. Replenishment control signals are supplied by control system 22 to replenishment system 24, which supplies developer and fix replenishment to tanks 16A and 16B respectively, based upon these replenishment control signals.

FIG. 2 shows a first embodiment of scanner system 18 of the present invention. In this embodiment, scanner system 18 includes light source 26, rotating drum 28, fixed aperture plate 30, and light sensor strip or bar 32. Scanner system 18 produces a moving light spot 42 which sweeps transversely across the transport path as film 10 is transported between rotating drum 28 and fixed aperture plate 30. The intensity of light spot 42 is sensed by sensor bar 32, which is sufficiently sensitive to distinguish the difference between "no film" and "clear film" conditions. Based upon the sensor output signal from sensor bar 32, control system 22 detects film width and film length, and determines film transmittance in the form needed for either continuous tone of half tone film replenishment.

As shown in FIG. 2, light source 26 is preferably a single tube which exhibits essentially even light intensity over the entire effective width of the transport path and exhibits a constant nonfluctuating light output. Inexpensive and mechanically simple implementations of such a single tube light source include neon, argon, fluorescent and incandescent tubes. In a preferred embodiment, light source 26 is a clear glass tube containing neon. This preferred light source has a long expected life (normally twenty years or more), does not develop dark spots with use since it contains no phosphors, and emits a red color which is useful for transmittance scanning of graphic arts film.

Drum 28 surrounds light source 26 and rotates about it. In the preferred embodiment shown in FIG. 2, light source 26 has its major light-emitting portion aligned along the axis of rotation of drum 28. The end portions of light source 26 which are located outside of drum 28 are preferably separated by opaque walls (not shown) so that light from the end portions does not leak into the area defined by aperture plate 30 and result in inaccurate readings.

Drum 28 is opaque except for a clear narrow slit 34 which spirals around drum 28. FIG. 2A shows the exterior surface of drum 28 as if it were rolled out flat. In this particular embodiment, clear slit 34 is a single slit which extends from one edge of drum 28 to the opposite edge so that only one portion of slit 34 is aligned with slit aperture 36 of aperture plate 30 at any time.

Drum 28 is rotated about the axis defined by light source 26. In the embodiment shown in FIG. 2, gear 38 which is attached to drum 28 and gear 40 which is driven by transport system 12 provide rotation of drum 28 in the direction of arrow 41 shown in FIG. 2. The effect of the drum pattern (with the narrow clear slit 34) and the drum rotation is a downward radiated light pattern in the form of a small light spot 42 which sweeps from left to right in FIG. 2.

In FIG. 2, aperture plate 30 is positioned between the transport path and sensor bar 32. In conjunction with the moving slit aperture 34 provided by drum 28, fixed slit aperture 36 of aperture plate 30 defines light spot 42 (shown in FIGS. 2 and 3) which sweeps across the detector surface of sensor bar 32.

As shown in FIG. 4, the effective pattern of the scanning process is a series of parallel scan lines 44. In FIG. 4, film 10 extends across the full width of transport path 14. If film 10 were narrower (as illustrated by dotted outline 10A), the scan lines 44 are the same, but only part of each scan line 14 intercepts the film.

By driving drum 28 in common with transport system 12, the same linear incremental sampling distance between scan lines 44 is obtained regardless of the speed at which the film is being transported along transport path 14. The number of scan lines 44 per unit film length, therefore, will be constant. It should be noted that the higher the ratio of drum rotation speed to film speed, the smaller the linear increment between scan lines and, therefore, the higher the scan resolution.

Sensor bar 32 is preferably a single photovoltaic cell, or a series of short strips of photovoltaic cells which are connected together in parallel. The output of sensor bar 32 is an analog signal which has a value generally proportional to the intensity of light spot 42 as received. The sensitivity of sensor bar 32 is sufficient to distinguish between "no film" condition when film 12 is not in the transport path between drum 28 and sensor bar 32, and a "clear film" condition in which film 12 is present in the transport path but is clear so that the reduction in intensity of light spot 42 from "no film" condition is only due to the effect of the film base.

Drum position sensor 46 shown in FIG. 2 provides a drum position signal which indicates the position of drum 28 in its rotation about its axis. The drum position signal is produced at least once for each 360° of revolution of drum 28. In preferred embodiments of the present invention, drum position sensor 46 is an optical or magnetic sensor which either senses the position of drum 28 directly, or senses it indirectly by sensing the rotational position of gear 40 or another shaft or gear of transport system 12 which is driven at the same time as drum 28.

By knowing the angular position of drum 28 relative to the pattern of slit 34, the position of light spot 42 in the transverse direction can be determined. By analyzing the output of sensor bar 32, it is possible to determine when the light spot is interrupted by the presence of film 10. The angle through which the drum 28 rotates while the light beam continues to be influenced by the presence of film 10 (as indicated by the output of sensor bar 32) is stored. In this way, film width is determined.

FIG. 5 includes a block diagram of control system 22, together with transport system 12 and replenishment system 24. In this embodiment, control system 22 includes microcomputer 48, operator interface 50, and analog-to-digital (A/D) converter 52. Microcomputer 48 (which includes a microprocessor together with associated read only (ROM) and random access read/-write memory (RAM), timer, clock and interface circuitry) controls transport system 12 and replenishment system 24 based upon signals from operator interface 50 and based upon the sensor output and drum position signals received from scanner system 18.

Microcomputer 48 receives inputs from operator interface 50 which define the transport speed and the replenishment rates. Based upon this information, microcomputer 48 controls transport system 12, and provides replenishment at the desired replenishment rates based upon the signals from scanner system 18. Operator interface 50 includes, in preferred embodiments, a keyboard for entering numerical values and commands, as well as input select switches. In addition, operator interface 50 preferably includes a display and other indicators which provide visual indications to the operator of the operating parameters being used, or other operating conditions of the processor.

The output from sensor bar 32 is an analog signal which varies in magnitude depending upon the transmittance of the film (if any) through which the light spot is passing. The sensor signal is periodically sampled by A/D converter 52, and is converted to a digital value at a rate which produces multiple sample values for each scan line 44. Each digital value is supplied to microcomputer 48, and is stored for subsequent analysis.

The scanner system 18 shown in FIG. 2 and control system 22 shown in FIG. 5 are capable of accurate replenishment for both continuous tone film and half-tone graphic arts film.

With continuous tone film, each digital sample value from A/D converter 52 is divided into the digital value previously stored for "no film"conditions. This results in a value of opacity, which is the inverse of transmittance T for the particular scan point through which the light spot was passing when the sensor signal was sampled. In other words:

$$\text{Opacity} = 1/T$$

As a first approximation for continuous tone film, optical density D is proportional to the amount of silver present in the image. Density is the logarithm to the base 10 of opacity. In other words:

$$D = \log_{10}(1/T)$$

Each sample value is converted to a density value by microcomputer 48. All of the density values for a particular film are summed to provide an integrated density value for that film. The summed or integrated density value is used by microcomputer 48, together with the previously stored replenishment rate, to control the developer replenishment provided by replenishment system 24.

With half-tone film, replenishment is proportional to percent dot, which in turn is equal to one hundred percent minus average percent transmittance. When half-tone film is being run through the processor, the sensor signals from scanner system 18 are again periodically converted by A/D converter 52 to digital sample values. The digital sample values for an entire scan line 44 are summed and divided by the sum of similar values obtained during "no film" conditions. This provides a percent transmittance value for that line. The percent transmittance values for all of the scan lines of a particular film are then averaged and subtracted from one hundred percent to give a value for percent dot. Based upon this derived value and the replenishment rate for that particular half-tone film, microcomputer 48 controls replenishment system 24 to provide the proper replenishment.

Control system 22 also determines film width and film length, and thus the area of the film which is needed for accurate fix replenishment.

Drum 28 is rotated at a known speed (because that speed is controlled by microcomputer 48 through its control of transport system 12). By knowing the time or angle of rotation of drum 28 from when the moving light spot 42 produced by drum 28 first interrupts one edge of film 10 until it passes the other edge of film 10, microcomputer 48 can determine the width of the film 10 which was scanned. There are several ways in which the film width can be determined based upon the signals which are available. First, microcomputer 48, through its internal timer, can time the intervals from receiving the film position signal until the first edge is encountered and until the second edge of the film is encountered based upon the sensor signals. The time difference between these two intervals can be converted to film width, since the rate of rotation and the drum slit 34 attack angle are both known.

Second, since A/D converter 52 samples at a known rate, the number of samples derived from the portion of the scan interrupted by film 10 is another measure of film width. Once again, this requires knowledge of the drum rotation rate and the drum slit 34 attack angle.

Third, if film rotation signals are in the form of encoder pulses representing incremental rotation of drum 28, the film width can be determined by counting film position signals which occur while the sensor signal indicates that film 10 is present. The drum slit attack angle is a known value, and is used in the calculation of film width.

Film length is determined by counting the number of scan lines 44 in which film 10 is detected as being present. Since the transport rate and rate of drum rotation are controlled by microcomputer 48, the number of scan lines 44 in which film 10 was detected provides a direct measurement of film length.

A trade-off to consider in effective resolution of scanner system 18 is the drum slit attack angle. FIGS. 6A and 6B show the effects of two different drum slit attack angles.

FIGS. 6A and 6B show the same fixed aperture 36, with two different moving drum slits 34' and 34''. The widths of slits 34' and 34'' are the same, but the attack angle of slit 34'' is greater than the drum slit attack angle of slit 34'. As a result, light spot 42' in FIG. 6A has a much greater effective spot width than light spot 42'' of FIG. 6B. This demonstrates that the greater the drum slit attack angle, the narrower the effective light spot for the same given drum slit and fixed slit aperture sizes. The effective spot width affects resolution in determining the edges of film 10, and consequently the resolution of film width detection. A larger attack angle (and thus a narrower spot width) is desirable if possible.

Figure 7A:
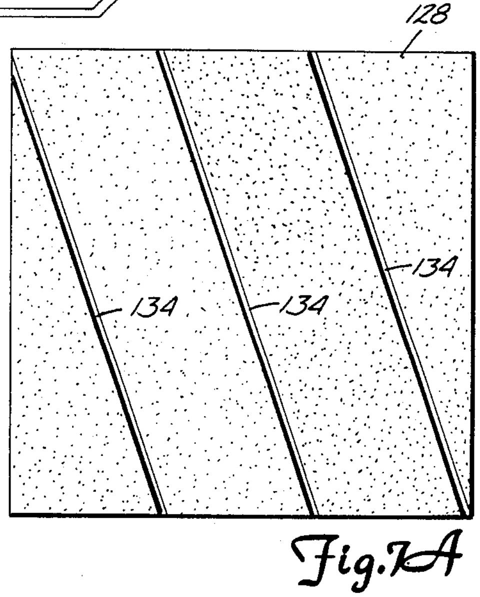
FIG. 7A shows the surface of the rotating drum of FIG. 7 when rolled out flat.

FIGS. 7 and 7A show another embodiment of the present invention which provides a large drum slit attack angle without requiring an excessively large diameter drum. Scanner system 118 of FIG. 7 is generally similar to the system 18 of FIG. 2, and similar numerals (increased by 100) are used to designate similar elements. For simplicity, the drive for rotation of drum 128 is not shown.

In the system of FIG. 7, drum 128 contains a spiral slit 134 which circles the circumference of drum 128 three times. The triple spiral slit 134 shown in FIG. 7 is used here as an example only. A greater or lesser number of revolutions of spiral slit 134 is used in other embodiments, depending on the system requirements, including the diameter of drum 128 and the film width resolution required.

Associated with each 360° rotation of spiral 134 is a separate sensor bar 132A, 132B and 132C. Each scanner bar 132A–132C is a single photovoltaic cell strip, or a series of individual cells or short strips which are connected together in parallel. Sensor bars 132A, 132B and 132C are individually addressable, and data is collected from each of them as an individual field. The sensor signals are supplied through analog multiplexer 154 to A/D converter 52. Multiplexer 154 is under the control of microcomputer 48, and allows data to be collected in an "absolute sequential" mode or in a "multiplexed sequential" mode.

The "absolute sequential" mode involves collecting data from sensor bar 132A during the first complete revolution of drum 128; then collecting data from sensor bar 132B during a second drum revolution; and finally collecting data from sensor bar 132C during a third revolution. Three revolutions of drum 128 are required to sense the full width of transport path 14. This process is then repeated, with three revolutions required for each complete scan. The film scan pattern which is produced is in the form of three line segments 144A, 144B and 144C making up each scan line. In order to produce the same scaning rate, drum 128 must rotate three times as fast as drum 128 of FIG. 2. The absolute sequential method, therefore, will in general require a high rotational speed of drum 128 in order to obtain sufficient resolution between complete film scan lines.

Figure 9:
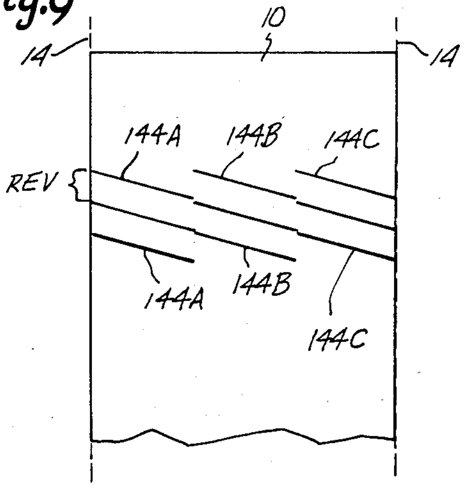
FIG. 9 is a diagram illustrating the effective film scan pattern when the scanner of FIG. 7 is operated in a multiplexed sequential mode.

By using a high speed A/D converter, a "multiplexed sequential" mode of data collection can be used. In this mode, each of the sensor bars 132A–132C is addressed through multiplexer 154 and a sample value is collected from each of them in a rapid sequential mode within a relatively short period of time (and consequently, a relatively small drum rotational angle). After a short delay in which the drum advances (moving the three light spots 142A, 142B and 142C slightly to the right), another rapid sequence of three sample value data points is collected. When the drum 128 has made one complete revolution, a complete scan of the width of transport path 14 has been accomplished. The effective pattern of the scan produced using the multiplexed sequential mode is illustrated in FIG. 9.

Figure 10A:
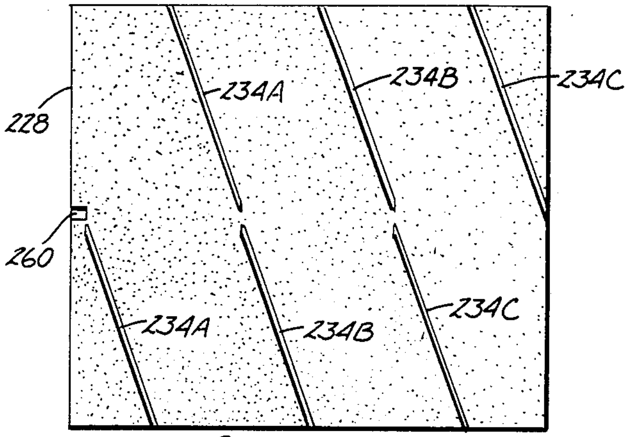
FIG. 10A shows the surface of the rotating drum of FIG. 10 when rolled out flat.
Figure 10:
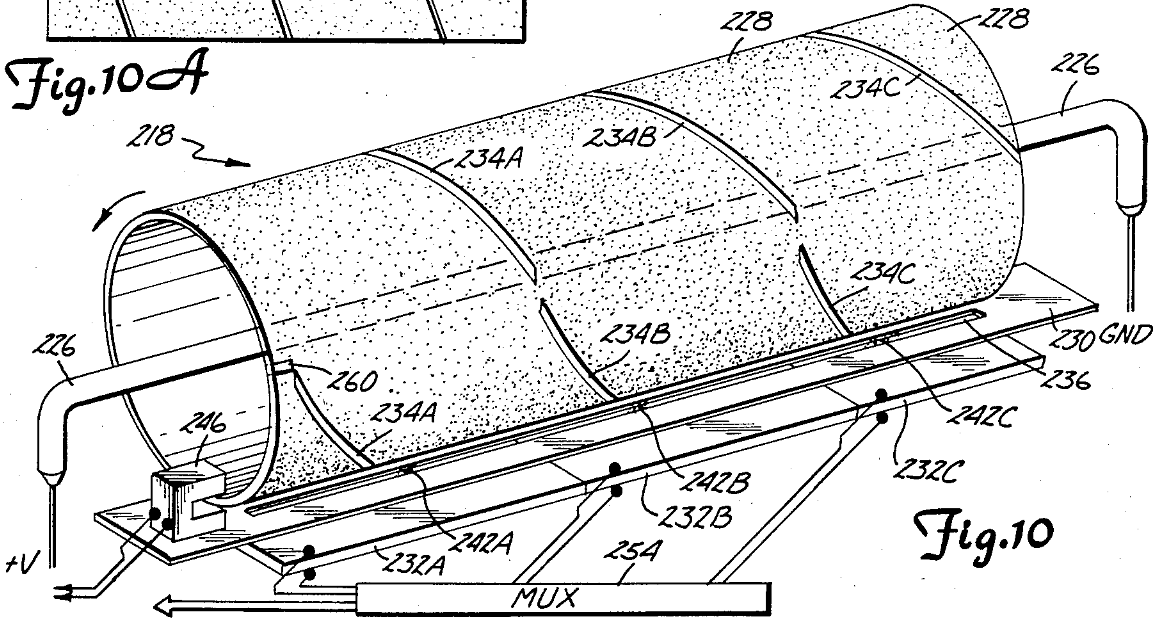
FIG. 10 shows a third embodiment of the scanner.

FIG. 10 shows still another embodiment (scanner system 218) which is generally similar to the systems shown in FIGS. 2 and 7 and similar reference characters beginning with "2" are used to describe similar elements.

In the embodiment shown in FIG. 10, the moving aperture is defined by three helical slit segments 234A, 234B and 234C. Each segment 234A, 234B and 234C extends nearly 360° around drum 228. A short gap is provided between the adjacent ends of slits 234A and 234B and between the ends of slits 234B and 234C. These short gaps create an optical dead time between revolutions. This dead time can be used in the absolute sequential mode described above to allow time to switch sensor addresses and to do other "housekeeping" tasks within microcomputer 48.

In FIGS. 10 and 10A, drum 228 also includes synchronizing mark 260, in the form of a short rectangular clear spot at the left edge of drum 228. Drum position sensor 246 in this embodiment is a transmissive sensing module, with a light source on one side and a light sensor on the opposite side. Each time mark 260 passes sensor 246, a film position signal is provided. Mark 260 is positioned on drum 228 with respect to the ends of slits 234A, 234B and 234C so that the film position signal indicates to microcomputer 48 that drum 228 is positioned with the scanning light spots at their leftmost positions and is ready to start a left-to-right scan of the three light spots 242A, 242B and 242C.

Figure 11:
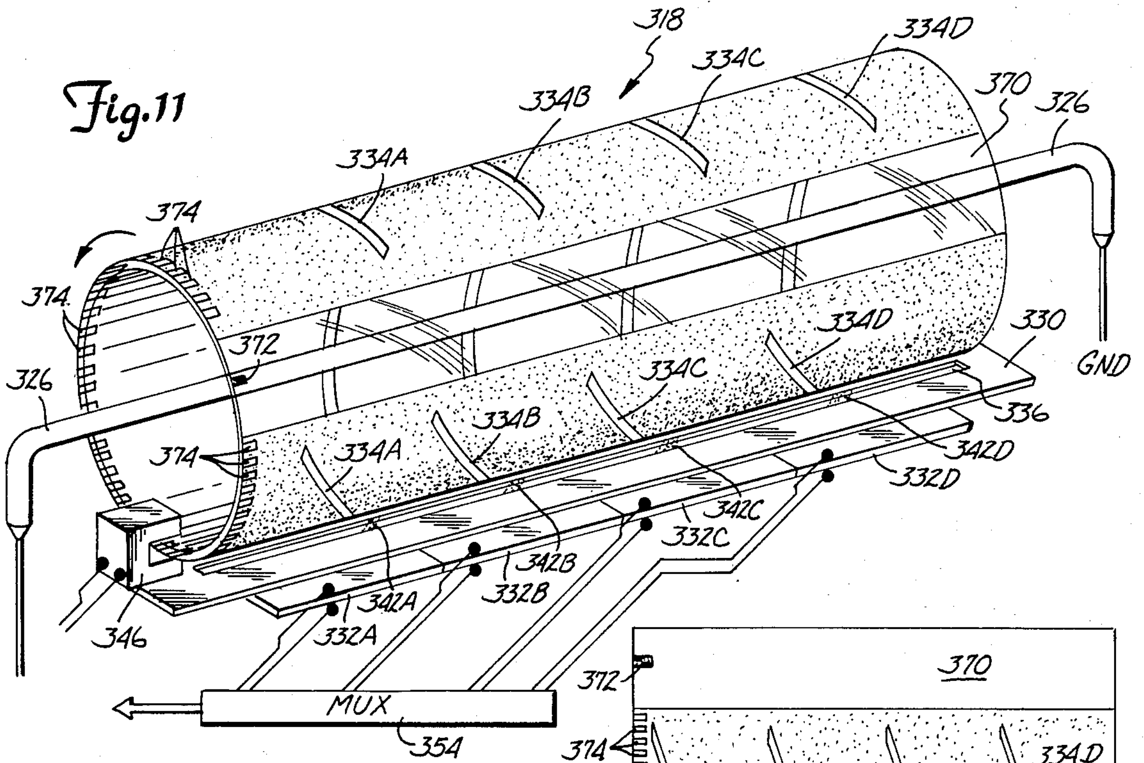
FIG. 11 shows a fourth embodiment of the scanner.
Figure 11A:
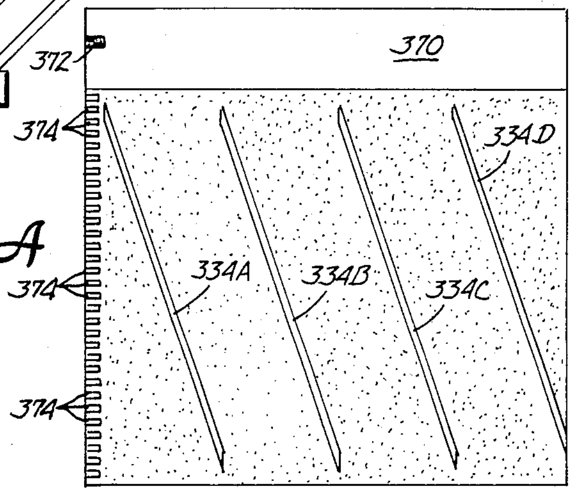
FIG. 11A shows the surface of the rotating drum of FIG. 11 when rolled out flat.
Figure 8:
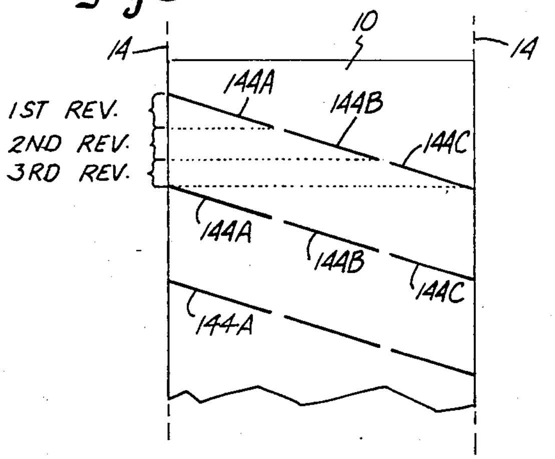
FIG. 8 illustrates the effective film scan pattern when the scanner of FIG. 7 is operated in an absolute sequential mode.

FIGS. 11 and 11A show still another embodiment (scanner system 318) of the present invention. In this embodiment, drum 328 contains four clear spiral slits 334A, 334B, 334C and 334D as well as a clear strip 370 which extends entirely across drum 328 in the axial direction. Four sensor bars 332A–332D receive the light spots 342A–342D generated by slits 334A–334D. In addition, when clear strip 370 is aligned with aperture 336, sensor bars 332A–332D receive a full width line of light.

The embodiment shown in FIGS. 11 and 11A, therefore, allow the film width and transmittance scan functions to be separated when half-tone film is being processed. As discussed previously, half-tone film developer replenishment is a function of percent dot, and therefore, an entire line can be scanned simultaneously.

In that event, the signals from sensor bars 334A–334D which are produced by the scanning light spots 342A–342D produced by slits 334A–334D are used to determine film width only. Data for film transmittance determination is not collected and accumulated while the spiral slits 334A–334D are moving the light spots 342A–342D across the sensor bars 332A–332D. Instead, the transmittance is sampled only once per drum revolution when clear window 370 is aligned with aperture 336. This transmittance measurement sample is triggered by a signal from transmissive drum position sensor 346 which indicates that dark sync mark 372 at the left edge of drum 328 is aligned with sensor 346.

Various other clear sync marks 374 are positioned circumferentially around drum 328 at the left end of drum 328. These clear sync marks 374 are sensed by drum position sensor 346, and are used to trigger the sampling of data from sensors 332A–332D as the light spots produced by slits 334A–334D are scanned from left-to-right. This data is used for film width determination.

The use of these triggering sync marks 372 and 374 at the edge of drum 328 allows greater position accuracy when sampling data than would be possible by using a timed sampling technique which is re-synchronized only once per drum revolution. Sync marks 372 and 374 also allow the elimination of software timing loops which otherwise are necessary to time the sampling cycle as the light spots 342A–342D are scanned.

The single full width sampling of film transmittance (once per revolution) also eases the complexity of data processing by microcomputer 48 because a single value is collected per revolution, rather than collecting, accumulating and processing many data points to determine a single left-to-right density scan.

The sampling of film transmittance while full width clear strip 370 is positioned over aperture 336 produces an output from sensors 332A–332D which is an integral of transmittance for the full width of transport path 14. While this is acceptable for half-tone film developer replenishment, continuous tone film replenishment is based on density integration, and the sensed transmittance of small width segments of the film must be converted to density prior to integration. When continuous tone film is being processed, scanner 318 of FIG. 11 uses the signals from sensors 332A–332D produced by the scanning light spots 342A–342D for both film width and transmittance scan purposes. In that case, the operation of scanner 318 of FIGS. 11 and 11A is identical to the operation of the other scanners 18, 118 and 218 previously described.

In conclusion, although the present invention has been described with reference to preferred embodiments, workers skilled in the art will recognize that changes may be made in form and detail without departing from the spirit and scope of the invention.

What is claimed is:

1. A replenishment control for a processor of continuous tone film in which the film is transported along a film transport path, the replenishment control comprising:

means for scanning a light spot across at least a portion of the film transport path;

means for providing a sensor signal which is a function of intensity of the light spot after the light spot has passed through the film transport path;

means for periodically sampling the sensor signal during each scan to produce a plurality of sample values for each scan;

means for converting each sample value to a density value;

means for summing the density values to produce an integrated density value; and means for producing a replenishment control signal as a function of the integrated density value.

2. The replenishment control of claim 1 wherein the means for scanning comprises:

an elongated light source positioned on a first side of the film transport path and extending generally in a transverse direction with respect to a direction of movement of the film;

means positioned between the light source and the film transport path for moving an aperture in the transverse direction to scan the light spot across the film transport path.

3. The replenishment control of claim 2 wherein the means for moving an aperture comprises:

a cylindrical drum surrounding the elongated light source, the drum having a central axis aligned generally parallel to the elongated light source, the drum being generally opaque and having a helical transparent slit; and means for rotating the drum about the central axis.

4. The replenishment control of claim 3 and further comprising:

an aperture plate positioned between the film transport path and the means for providing a sensor signal, the aperture plate having an aperture extending in the transverse direction generally parallel to the central axis.

5. The replenishment control of claim 3 and further comprising:

means for providing a drum position signal indicative of angular position of the cylindrical drum.

6. The replenishment control of claim 5 and further comprising:

means for deriving from the drum position signal and the sensor signal a width of the film transported along the film transport path.

7. The replenishment control of claim 6 and further comprising:

means for deriving a film length from the sensor signal and the drum position signal.

8. The replenishment control of claim 3 wherein the means for rotating the drum rotates the drum at a rate which is dependent upon a rate at which the film is transported along the film transport path.

9. The replenishment control of claim 8 wherein the film is transported along the film transport path by a film transport drive, and wherein the means for rotating the drum is coupled to the film transport drive.

10. A replenishment control for a processor of continuous total film in which the film is transported along a film transport path, the replenishment control comprising:

means for periodically sampling intensity of light transmitted through the film transport path at a plurality of locations arranged generally transverse to a direction of film movement along the film transport path to produce a plurality of sample values;

means for converting the sample values to density values;

means for summing the density values to produce an integrated density value; and means for producing a replenishment control signal as a function of the integrated density value.

11. The replenishment control of claim 10 wherein the means for periodically sampling comprises:

means for scanning a light spot across each of a plurality of segments of the film transport path in a generally transverse direction; and means positioned on an opposite side of the film transport path from the means for scanning to receive the scanned light spot after it has passed through the film transport path and providing a sensor signal; and means for periodically sampling the sensor signal.

12. A replenishment control for a processor of film in which the film is transported along a film transport path, the replenishment control comprising:

an elongated light source positioned on a first side of the film transport path and extending generally in a transverse direction with respect to a direction of movement of the film;

means positioned between the light source and the film transport path for moving an aperture in the transverse direction to scan a light spot across at least a portion of the film transport path;

means positioned on an opposite side of the film transport path from the elongated light source for providing a sensor signal which is a function of intensity of the light spot after it has passed through the film transport path;

means for periodically sampling the sensor signal during each scan to produce a plurality of sample values for each scan; and means for producing a replenishment control signal based upon the plurality of sample values.

13. The replenishment control of claim 12 wherein the means positioned between the light source and the film transport path for moving an aperture in the transverse direction comprises:

a cylindrical drum surrounding the elongated light source, the drum having a central axis aligned generally parallel to the elongated light source, the drum being generally opaque and having a helical transparent slit; and means for rotating the drum about the central axis.

14. The replenishment control of claim 13 and further comprising:

an aperture plate positioned between the film transport path and the means for providing a sensor signal, the aperture plate having an aperture extending in the transverse direction generally parallel to the central axis.

15. The replenishment control of claim 13 and further comprising:

means for providing a drum position signal indicative of angular position of the cylindrical drum.

16. The replenishment control of claim 15 and further comprising:

means for deriving from the drum position signal and the sensor signal a width of the film transported along the film transport path.

17. The replenishment control of claim 15 and further comprising:

means for deriving a film length from the sensor signal and the drum position signal.

18. The replenishment control of claim 17 wherein the means for producing a replenishment control signal bases the replenishment control signal on the plurality of sample values, the film width, and the film length.

19. The replenishment control of claim 13 wherein the means for rotating the drum rotates the drum at a rate which is dependent upon a rate at which the film is transported along the film transport path.

20. The replenishment control of claim 19 wherein the film is transported along the film transport path by a film transport drive, and wherein the means for rotating the drum is coupled to the film transport drive.

21. The replenishment control of claim 12 wherein the means for producing a replenishment control signal comprises:

means for converting each sample value to a density value;

means for summing the density values to produce an integrated density value; and means for producing a replenishment control signal as a function of the integrated density value.

* * * * *